Oct. 27, 1953  C. H. HOKLAS  2,657,286
PUSH-BUTTON TURN SIGNAL SWITCH
Filed Jan. 4, 1951  2 Sheets-Sheet 1

Clarence H. Hoklas
INVENTOR.

Oct. 27, 1953   C. H. HOKLAS   2,657,286
PUSH-BUTTON TURN SIGNAL SWITCH
Filed Jan. 4, 1951                                2 Sheets-Sheet 2
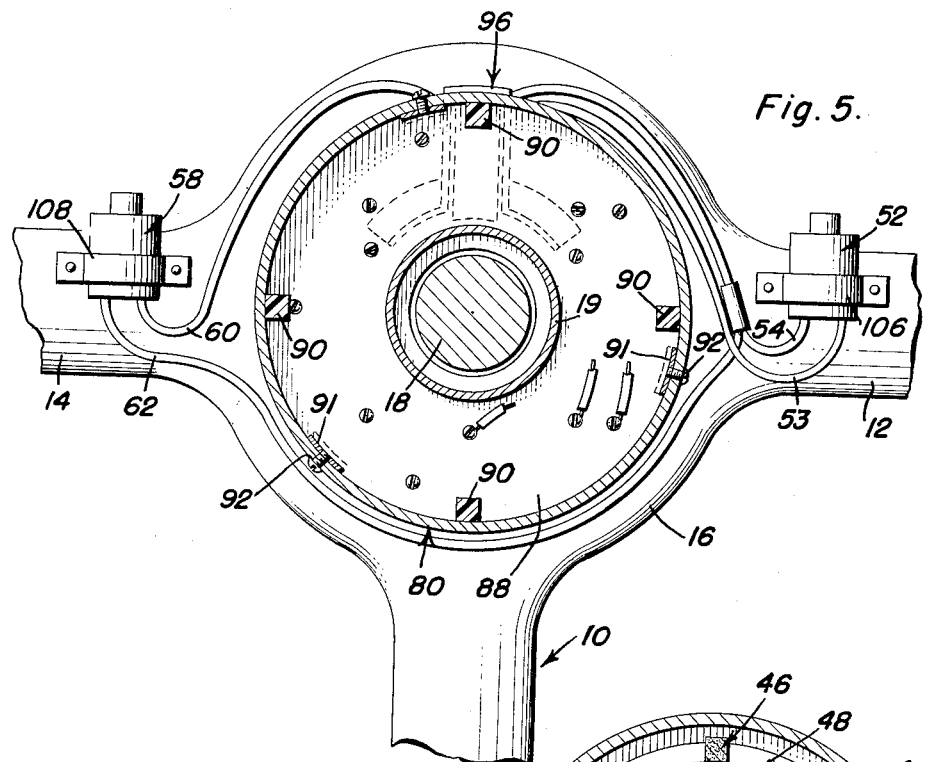
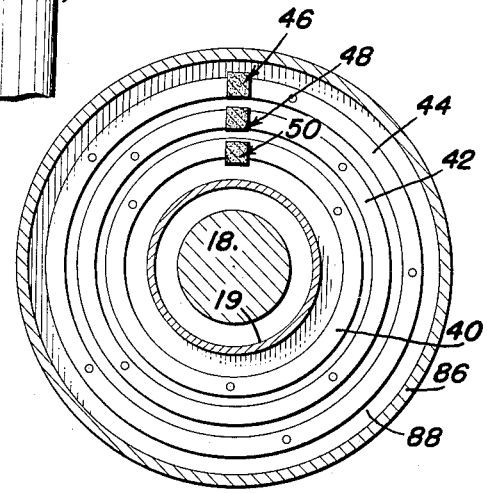
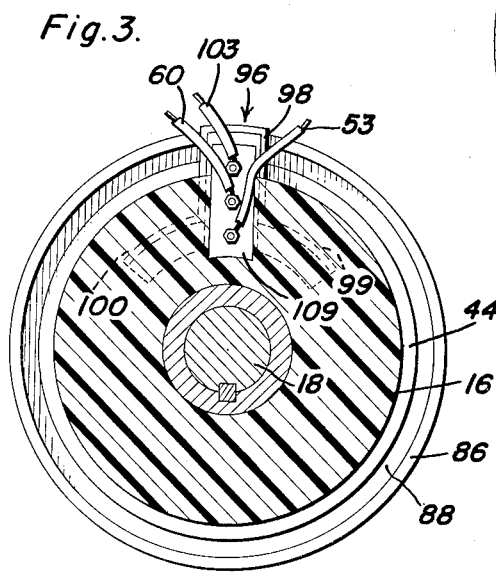
Clarence H. Hoklas
INVENTOR.

Patented Oct. 27, 1953

2,657,286

UNITED STATES PATENT OFFICE 2,657,286

PUSH-BUTTON TURN SIGNAL SWITCH

Clarence H. Hoklas, Chicago, Ill., assignor of twenty-five per cent to George L. Hoklas, Chicago, Ill.

Application January 4, 1951, Serial No. 204,433

1 Claim. (Cl. 200—61.27)

This invention relates to improvements in attachments for vehicles.

An object of this invention is to provide an improved turn signal operating assembly which is so constructed as to make it unnecessary to reach below the steering wheel in order to operate a turn signal control lever and which, when caused to be operative, retains the turn signal lamps operative until such time that a positive application of force on one of the switches turns the lamp off.

Ancillary objects and features of importance will become apparent in following the description of the illustrated form of the invention.

In the drawings:

Figure 3 is a sectional view taken on the line 3—3 of Figure 1 and in the direction of the arrows;

Figure 4 is a sectional view taken on the line 4—4 of Figure 1 and in the direction of the arrows; and Figure 5 is a sectional view taken substantially on the line 5—5 of Figure 1 and in the direction of the arrows.

I have illustrated a fragmentary part of a standard steering wheel 10 which includes spokes 12 and 14 emanating from a steering wheel hub 16. The steering column 18 is provided with a nut 20 to help hold the steering wheel 10 in place thereon. This construction is standard.

Figure 2:
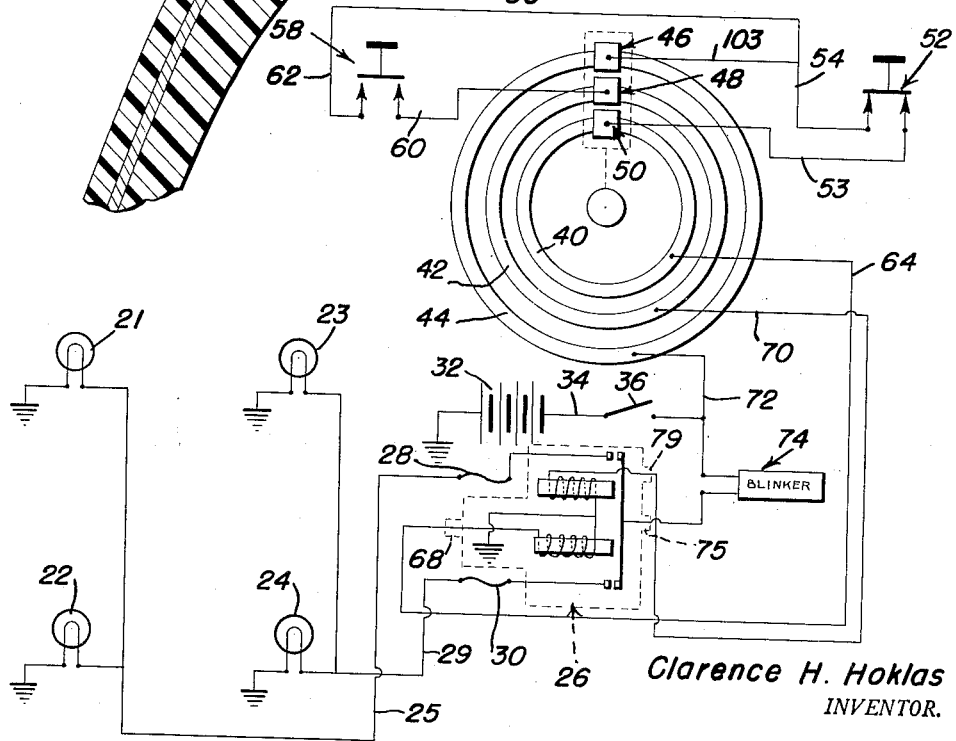
Figure 2 is a schematic layout of wiring suggested in connection with the invention.

Attention is now invited to Figure 2. Left vehicle lamps 21 and 22 are shown, as are the right lamps 23 and 24. A conductor 25 extends from the lamps 21 and 22 appropriately and to a terminal of a standard relay 26, the wire 25 being fused as at 28, the fuse being carried by a part of the relay. The wire 29 extending from the right lamps 23 and 24 is fused as at 30, this fuse also being carried by the relay casing and forming a part of the relay.

Figure 1:
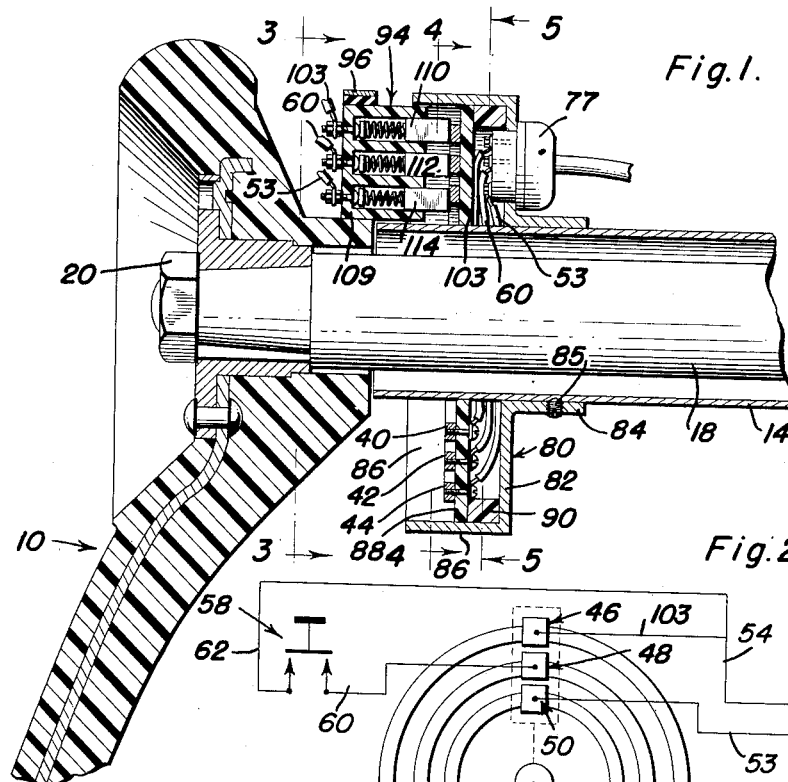
Figure 1 is a sectional view of a standard fragmentarily shown steering wheel showing the emplacement of the improved device.

A source of current, as the battery 32 is diagrammatically shown in Figure 1 and has a line 34 extending therefrom with a switch 36 therein representing a standard vehicle ignition switch.

There are three collector rings 40, 42 and 44 arranged concentrically about the steering column of the vehicle. Each collector ring has a brush assembly contacting it (Figure 2), the brush assembly 46, 48, and 50 being mounted appropriately for this purpose.

A switch 52 to control the right lamps has one wire 53 connected with the brush assembly 50 and another wire 54 connected with the brush assembly 46, this assembly being used as a part of the primary circuit being grounded through the relay 26.

The switch 58 is provided with a wire 60 which connects with the brush assembly 48 and a wire 62 which connects with the brush assembly 46.

The inner ring 40 has a lead 64 extending therefrom which is connected to a terminal 68 of the relay, while the ring 42 is provided with a wire 70 which is connected with a terminal 79 of the relay and the collector ring 44 is provided with a wire 72 which is connected with the standard flasher or blinker 74 and then to a terminal 75 of the relay.

The wiring is arranged such that the wires 64, 70 and 72 are arranged in a plug 77 which fits into a suitable opening in the back part of a housing 80. This housing is substantially circular and comprises a back plate 82 provided with a boss 84 which fits over the steering column tube 19 and which is held in place by standard screws 85. There is an upwardly extending flange 86 at the edge of the plate 82 which defines a cavity 87 into which the rings 40, 42 and 44 are placed. The rings are mounted on an electrically insulating back plate 88 which is fastened in the cavity 87 and which is spaced by means of an insulating spacer ring or blocks 90 from the back plate 82 in order to allow ample space for the wiring.

In order to prevent the insulating material mounting plate 88 from slipping in the housing 80, a plurality of L-shaped clips 91 are fitted in peripheral notches provided in the plate 88 and each L-shaped bracket has a screw 92 threaded therein, the screws being passed through apertures in the flange 86 of the housing.

The brush assemblies 44, 48 and 50 are located in a casing 94 which has a mounting bracket 96 fixed thereto. This mounting bracket (Figure 3) is provided with a U-shaped upper portion or bight 98 and has smoothly curved legs 99 and 100 extending from the lower ends thereof and fastened to the steering wheel by means of screws or like standard fastening elements. The preferable location for attachment of the legs 99 and 100 is the hub 16 of the steering wheel.

As noted from inspection of Figure 1 the wires 62 and 54 are connected to the brush assembly by means of the common wire 103, while the wires 60 and 53 are arranged to extend to the switches 52 and 58, these switches being installed in the removable center cover of the steering wheel, or if there is insufficient space under this cover they may be attached or secured to the steering wheel spokes 12 and 14 by means of mounting brackets 106 and 108. The switches 52 and 58 are of standard type and are so arranged that when they are actuated by pushing the buttons thereof, the switches stay closed until such time that the buttons are again operated.

A block 109 of insulating material is located beneath the bight 98 of the bracket 96 and has three inwardly opening pockets 110, 112 and 114 therein, each pocket accommodating a single brush assembly so that the contact of the brush assembly may press against the slip rings. The brush assemblies are of the spring loaded type so that the contacts thereof always press firmly against the slip rings 40, 42 and 44.

In operation one of the buttons, for example the button of the switch 52 is pressed. This closes the circuit including the slip rings 44 and 40 causing through the blinker 74, relay 26 and necessary wiring disclosed in Figure 1, the right lamps 23 and 24 of the vehicle to operate intermittently. They will continue to operate until such time that the button of the switch 52 is again pressed to open this circuit. When the button of the switch 58 is pressed, the circuit including the relay, slip rings 44 and 42 and other necessary components including the blinker 74 is completed thereby causing the lamps 21 and 22 to operate intermittently.

Having described the invention, what is claimed as new is:

For use in an automotive vehicle, a turn signal attachment comprising left and right turn signal switches adapted to be mounted on the steering wheel of a vehicle, a pair of electrical leads leading from each switch, a three brush assembly adapted to be mounted on the steering wheel of the vehicle, one lead from each switch being connected to a common first brush, the other leads from said switches being connected to the second and third brushes, respectively, a three ring collector ring assembly adapted to be mounted on the steering column of the vehicle and having first, second and third rings contacting the respective brushes, first, second and third conductors extending from said rings, said first conductor being electrically energized, and passing through a blinker unit to a balanced relay bar, the second and third conductors being wound on electromagnets disposed at the opposite ends of said relay bar, and left and right lamp wires having contacts thereon disposed adjacent the ends of said relay bar, closing of either switch energizing its associated electromagnet to draw the relay bar into contact with the lamp wires of one side of the vehicle and causing the same to blink intermittently and closing of both switches causing the relay bar to alternately contact both the left and right lamp wires of the vehicle.

CLARENCE H. HOKLAS.

References Cited in the file of this patent

UNITED STATES PATENTS

| Number | Name | Date |
| --- | --- | --- |
| 1,389,366 | Loder | Aug. 30, 1921 |
| 1,435,692 | Blackburn | Nov. 14, 1922 |
| 1,643,706 | East | Sept. 27, 1927 |
| 2,021,386 | Russell | Nov. 19, 1935 |
| 2,268,545 | Crider | Jan. 6, 1942 |
| 2,282,761 | Herwig | May 12, 1942 |
| 2,433,938 | Varner | Jan. 6, 1948 |

FOREIGN PATENTS

| Number | Country | Date |
| --- | --- | --- |
| 341,807 | Great Britain | Jan. 22, 1931 |